(12) United States Patent
Hasegawa et al.

(10) Patent No.: US 8,821,147 B2
(45) Date of Patent: Sep. 2, 2014

(54) EXTRUSION DIE DEVICE

(75) Inventors: Nobuyuki Hasegawa, Tokyo (JP);
Noboru Orito, Kazuno (JP)

(73) Assignee: Mitsubishi Aluminum Co., Ltd., Tokyo (JP)

(*) Notice: Subject to any disclaimer, the term of this patent is extended or adjusted under 35 U.S.C. 154(b) by 0 days.

(21) Appl. No.: 13/806,938

(22) PCT Filed: Jun. 30, 2011

(86) PCT No.: PCT/JP2011/064999
§ 371 (c)(1),
(2), (4) Date: Dec. 26, 2012

(87) PCT Pub. No.: WO2012/002474
PCT Pub. Date: Jan. 5, 2012

(65) Prior Publication Data
US 2013/0108727 A1   May 2, 2013

(30) Foreign Application Priority Data

Jun. 30, 2010 (JP) .................................. 2010-149312
Jul. 30, 2010 (JP) .................................. 2010-172857
Aug. 31, 2010 (JP) .................................. 2010-194841

(51) Int. Cl.
*B29C 47/08* (2006.01)

(52) U.S. Cl.
USPC ........... 425/192 R; 72/269; 425/380; 425/467

(58) Field of Classification Search
USPC .......................... 425/192 R, 380, 467; 72/269
See application file for complete search history.

(56) References Cited

U.S. PATENT DOCUMENTS 3,527,079 A * 9/1970 Braeuninger ................... 72/269
5,131,253 A * 7/1992 Hopkins ......................... 72/269
(Continued)

FOREIGN PATENT DOCUMENTS

CN    101687237 A    3/2010
JP    S52-135432    10/1977
(Continued)

OTHER PUBLICATIONS

International Search Report Issued Sep. 13, 2011 in PCT/JP11/64999 Filed Jun. 30, 2011.
(Continued)

*Primary Examiner* — Dimple Bodawala
*Assistant Examiner* — Joseph Leyson
(74) *Attorney, Agent, or Firm* — Oblon, Spivak, McClelland, Maier & Neustadt, L.L.P.

(57) ABSTRACT

An extrusion die device includes a die holder including a supporting hole and a die assembly accommodated in the supporting hole, wherein the die assembly includes a male die including a core member having a projected portion, a core case holding the core member, a female die including a body which includes an engagement groove engaging the core case of the male die, and which engages the supporting hole, and a nesting member formed in an annular shape and accommodated in the body at a portion close to a raw material supply part, and a cap member formed in a plate shape, disposed at a position closer to the raw material supply part than from the male die, covering a portion of the core member, and connected to the core case, and wherein a space between the nesting member and the core member is defined as a molding hole allowing the extrusion raw material to pass therethrough.

9 Claims, 10 Drawing Sheets

(56) References Cited

U.S. PATENT DOCUMENTS 5,152,163 A * 10/1992 Hawkes et al. ................ 72/262
5,337,593 A * 8/1994 Yano .............................. 72/269
6,776,019 B2 * 8/2004 Yano .............................. 72/269

FOREIGN PATENT DOCUMENTS

| JP | 5 57337 | 3/1993 |
| JP | 06-007837 | 1/1994 |
| JP | 06-023424 | 2/1994 |
| JP | 07-019775 | 1/1995 |
| JP | 7 124634 | 5/1995 |
| JP | 09-057334 | 3/1997 |
| JP | 2001-191109 A | 7/2001 |
| JP | 2002 45913 | 2/2002 |
| JP | 2003-181525 A | 7/2003 |
| JP | 2003-205310 A | 7/2003 |
| JP | 2003-230909 A | 8/2003 |
| JP | 2003 326309 | 11/2003 |
| JP | 2005-059022 A | 3/2005 |
| JP | 2008 110396 | 5/2008 |
| JP | 2010-512248 | 4/2010 |

OTHER PUBLICATIONS

Office Action issued May 7, 2014 in Japanese Patent Application No. 2010-149312 filed Jun. 30, 2010 (with English Translation).

Office Action issued May 7, 2014 in Japanese Patent Application No. 2010-172857 filed Jul. 30, 2010 (with English Translation).

Office Action issued May 20, 2014 in Chinese Patent Application No. 201180031667.2 filed Jun. 30, 2011 (with Partial English Translation).

Office Action issued Jun 24, 2014 in Japanese Patent Application No. 2010-194841, filed Aug. 31, 2010 (w/English-language Translation).

* cited by examiner

EXTRUSION DIE DEVICE

CROSS REFERENCE TO RELATED APPLICATIONS

This application is a national stage of International Patent Application No. PCT/JP2011/064999 filed Jun. 30, 2011, and claims the benefit of priorities under 35 U.S.C. §119 of Japanese Patent Applications No. 2010-149312, filed Jun. 30, 2010, No. 2010-172857, filed Jul. 30, 2010, and No. 2010-194841, filed Aug. 31, 2010, the contents of which are entirely incorporated herein by reference.

TECHNICAL FIELD

The present invention relates to an extrusion die device which is suitable for producing, through an extrusion process, flat multi-hole tubes or the like which are used, for example, for various aluminum heat exchangers.

BACKGROUND ART

An extrusion process has been broadly used for producing various tubes for aluminum heat exchangers, which are used for heat exchangers such as evaporators, condensers, and radiators since the melting point of aluminum, which is a raw material, is low.

In such an extrusion process, as shown, for example, in FIG. 8, an aluminum raw material (billet) 103 is inserted into a hole of a container 102 to which a die 101 is attached at an end thereof, the aluminum raw material 103 in the container 102 is pressed toward an opening 105 provided in the die 101 by a stem (pressurizing plate) 104, the aluminum raw material 103 is extruded through a gap having a constant cross-section shape and provided in the opening 105, and whereby the material is extruded so as to be an extruded part having a constant cross-section shape. According to this extrusion process, it is possible to obtain an extruded part having a very complicated shape through a single deformation process by applying compressive force to the aluminum raw material 103 inserted into the container 102.

FIG. 9 shows an example of a flat multi-hole tube 106 for an aluminum heat exchanger, which is formed through an extrusion process of aluminum. Conventionally, an insert type die disclosed in Patent Document 1 has been known as an extrusion die device which is suitable for producing the extruded flat multi-hole tube 106.

An example of a conventional insert type die device disclosed in Patent Document 1 is shown in FIGS. 10 and 11. A die 100 of this example is provided to produce the extruded flat multi-hole tube 106 of aluminum shown in FIG. 9 through an extrusion process, and includes a pair of a female die 111 and a male die 112 having a thick circular-disc shape and being engageable and detachable, which are insertable into and detachable from through holes H provided in a circular-disc shaped die holder D shown in FIG. 11.

In FIG. 10, the female die 111 includes an annular centering recess 113 provided at the outer periphery of an end surface facing the male die 112, and a recess 115 is provided in a enter end surface 114 of the centering recess 113. Furthermore, a slit-shaped hole 116 extending from an end to the other end along the center axis of the female die 111 is provided at the center portion of the recess 115. Moreover, two threaded holes 119 and two pin holes 120 are provided in a symmetrical manner at locations surrounding the recess 115.

In FIG. 10, the male die 112 includes a centering projection 122 provided at the outer periphery of an end surface facing the female die 111. A comb-shaped projected portion 123 consisting of a plurality of projected pieces is provided at the center portion of the male die 112. The projected portion 123 is provided to be inserted into the hole 116 of the female die 111 so as to form a gap (molding hole), which defines the shape of a product, between the projected portion 123 and the hole 116. Furthermore, the male die 112 is provided with through holes 124 extending along the both sides of the projected portion 123 and opening into both surfaces of the male die 112. Moreover, the male die 112 is provided with two threaded holes 125 and two pins 126 around the through holes 124.

Moreover, the die 100 is configured by integrating the male die 112 and the female die 111 having a configuration as described above into a circular column shape while engaging the centering recess 113 and the entering projection 122 and engaging the pins 126 and the pin holes 120. An extrusion process can be performed by attaching four dies 100 to the disc-shaped die holder D shown in FIG. 11, and by attaching the whole device to the container 102 shown in FIG. 8. Furthermore, the die 100 having this configuration provides an advantage such as an economical point when compared with an integrated type die because, when one of the dies 100 in the die holder D fails, an extrusion process can be resumed by only replacing the particular die 100 or by only replacing either the particular female die 111 or the particular male die 112.

Furthermore, the applicant of the present application has filed a patent application relating to a die having a configuration in which a portion of a projected portion for forming a molding hole in an extrusion process can be replaced as a core member separately from the other parts of a male die (refer to Patent Document 2).

According to the technology disclosed in Patent Document 2, the male die is constituted by providing a core member having a projected portion and a core case to which the core member is attached, the core member is made of cemented carbide having a high wear resistance, and the core case is made of ordinary die steel, whereby, it is possible to increase the life of the die, and to enhance replaceability when encountering partial wear or breakage.

PRIOR ART DOCUMENT

Patent Documents

Patent Document 1: JP07-124634A
Patent Document 2: JP2002-45913A

SUMMARY OF INVENTION

Problem to be Solved by the Invention

In the die device having a configuration in which an extrusion process is performed by attaching the four dies 100 to the die holder D, an extrusion process is performed in such a manner that the stem 104 evenly presses the aluminum material 103 against the four dies 100 so that the aluminum material 103 passes through the through holes 124 provided in the male die 112 of each of the four dies 100 due to the flowability thereof, and is extruded through the gap provided by the hole 116 and the projected portion 123 of the female die 111.

However, in the case of an extrusion device using a conventional die, there is a problem in that, when the thin and flat multi-hole tubes 106 shown in FIG. 9 are made through an extrusion process, the thickness of some of the flat multi-hole tubes 106 among the flat multi-hole tubes 106 extruded from the die 100 fluctuates partially. For example, the flat multi-hole tube 106 is constituted by integrating a peripheral wall 106*a* having a flat tube shape and a plurality of partitioning walls 106*b* which separate the peripheral wall 106*a* into a plurality of flowing paths, and a problem is encountered in that the thickness of the plurality of partitioning walls 106*b* tends to fluctuates.

The inventors of the present invention have conducted a research to find the cause of the problem, and it has been revealed that defects in the shape of the partitioning walls are caused by degradation of flowability of the material at the molding hole due to a high flow resistance of the material, in the case of the conventional die 100, when passing through a flow path located upstream of the molding hole, i.e., when passing through the through holes 124.

Moreover, because the stem 104 presses the aluminum raw material 103 at a high pressure for extrusion, the position of the die 100 attached to the die holder D is slightly changed due to the pressure applied to the aluminum raw material 103, and it is considered that the changes in the position lead to production of a flat multi-hole tube 106 partially having a different thickness.

Furthermore, in the case of a die device having a configuration in which the male die is divided into a projected portion and a core portion as disclosed in Patent Document 2, because the male die itself is divided, the position of the core member or the body may shift individually due to the pressure of the aluminum raw material 103, and thus, such a configuration is not preferable in terms of possible uneven thickness.

The comb-shaped projected portion 123 of the male die 112 is shown in FIG. 12 in an enlarged manner, and the tips of the projected portion 123 are shown in FIG. 13 in a further enlarged manner. The projected portion 123 is configured in such a manner that projection bodies 131 having an elongated column shape are arranged in a row at a constant interval at the tip portion of a base plate 130, each of the projection bodies 131 includes an enlarged head portion 132 at the tip thereof, and a gap 133 are formed between the adjacent projection bodies 131.

In recent years, when producing a flat multi-hole tube 106 shown in FIG. 9, the number of holes 106H tends to increase, for example, from 4 to 10 or 20, even the width M of the flat multi-hole tube 106 remains the same. This is because the more the holes 106H are provided, the higher heat exchange efficiency can be obtained, and there is a demand for higher heat exchange efficiency of the flat multi-hole tube 106.

However, when the number of the holes 106H are increased, a gap Na between the enlarged head portions 132 of the projection bodies 131 becomes smaller as shown in FIG. 13, and a gap Nb between the of the projection bodies 131 also automatically becomes smaller, and thus it tends to be difficult for the aluminum raw material to flow through the gaps. As a result, there were possible defects in that the thickness of the partitioning walls 106*b* of the flat multi-hole tube 106 obtained as an extruded product is short, or a portion of the partitioning walls 106*b* lacks.

Moreover, when the flat multi-hole tube 106 is of a small and thin type, the gap between the projected portion 123 and the hole 116 is small, and high pressure and temperature are applied when the aluminum raw material is made flow and extruded; therefore, a problem is encountered in that the male die 112 and the female die 111 tend to easily wear during long term use even if they are made of a material having a high wear resistance such as die steel or cemented carbide.

Accordingly, a further improvement of a die device is demanded in order to obtain a longer life of the die device consisting of the male die 112 and the female die 111, or to prevent damage and breakage of the die device during an extrusion process.

The present invention was conceived of in view of the problems described above, and an object thereof is to provide an extrusion die device which makes it possible to produce flat multi-hole tube tubes having partitioning walls of predetermined thickness by reducing the flow resistance of raw material at the flow path located upstream of a molding hole, and thereby improving the flowability of the raw material at the molding hole.

Another object of the present invention is to provide an extrusion die device which makes it possible to strongly maintain a supporting state of a die assembly with respect to a die holder, and to produce extruded products with no fluctuation in thickness even when the extruded products are thin products.

A further object of the present invention is to provide an extrusion die device which makes it possible to smoothly introduce raw material into a molding hole formed by a gap between the projected portion of a male die and the hole of a female die, and thereby to produce fair extruded products with few defects even when the extruded products are of a complicated shape.

Means for Solving the Problem

In order to solve the above problems, the present invention provides an extrusion die device including a die holder including a first surface located at an inlet side of an extrusion raw material, a second surface located at an outlet side of a formed material, and a supporting hole penetrating from the first surface to the second surface; and a die assembly accommodated in the supporting hole, wherein the die assembly includes a male die including a core member having a projected portion, a core case holding the core member while disposing the projected portion close to the second surface; a female die including a body which includes an engagement groove engaging the core case of the male die disposed close to the first surface, and which engages the supporting hole, and a nesting member formed in an annular shape and accommodated in the body at a portion close to the first surface; and a cap member formed in a plate shape, disposed at a position closer to the first surface than from the male die, covering a portion of the core member, and connected to the core case, and wherein a space between the nesting member and the core member is defined as a molding hole allowing the extrusion raw material to pass therethrough.

According to the present invention, because the engagement portion is provided at the distal end of the body of the female die so as to be engaged with the supporting hole of the die holder to which the die assembly is attached, a positioning process at attaching the die assembly to the supporting hole of the die holder is reliably performed. More specifically, by engaging the engagement portion of the body of the die assembly (the female die) with the supporting hole of the die holder, the female die is reliably positioned in the supporting hole in the radial direction and the depth direction of the supporting hole of the die holder. As a result, the position of the female die does not change even when pressure is applied in a direction to shift the female die due to the pressure from the raw material billet, it is possible to produce extrusion products with no local fluctuation in thickness even when producing thin extrusion products.

When using, for example, aluminum alloy as a raw material billet, and even when producing an extrusion product having configuration in which thin walls are provided, such as in a flat multi-hole tube for heat exchangers, and flow path is partitioned by these thin walls, the thicknesses of the walls that partition the flow path can be uniformed, and high-quality flat multi-hoe tubes for heat exchangers can be produced.

In the present invention, because the male die includes the core member, the core case, and the cap member, the female die includes the body and the nesting member (a plate member), and thus members receiving the pressure from the raw material billet are provided in plurality, even when any of these members are damaged, it is possible to produce extrusion products by replacing only the damaged members and by reusing the rest of the members of the male die or the rest of the members of the female die.

Moreover, although the male die and the female die are made replaceable part by part as described above due to a segmented configuration, the core case, the cap member, and the body are reliably engaged with, fixed to, and positioned to the inside of the supporting hole, respectively, and thus it is possible to produce extrusion products with stable quality and with no fluctuation in thickness.

In the above extrusion die device, the cap member may include two main surfaces and a recessed portion formed at a center of the main surfaces.

In this case, because the recessed portion is provided at the center of the main surfaces, when the extrusion die is attached to the supporting hole of the die holder, the cross-sectional area of the space formed between the cap member and the supporting hole is expanded when compared with the case in which the recessed portion is not provided. Accordingly, the flow resistance of the raw material is reduced when the raw material is introduced from the inlet of the supporting hole, and is extruded from the molding hole via the various spaces in the supporting hole, and a smooth flow of the raw material can be created. Therefore, it is possible to perform an extrusion process while precisely reflecting the shape of the molding hole, and to reliably obtain a flat multi-hole tube including partitioning walls having a predetermined thickness. Moreover, the flow rate of the raw material in the spaces and at the molding hole in the supporting hole can be increased, and it is possible to produce extrusion products such as flat multi-hole tubes at high efficiency.

In the above extrusion die device, the recessed portion may be formed by an inclined surface in such a manner that the thickness of the cap member is gradually reduced from the first surface to the second surface.

In the above extrusion die device, the recessed portion may be formed in such a manner that the depth thereof is constant.

When the recessed portion is formed by an inclined surface in such a manner that a thickness of the cap member is gradually reduced toward the male die (from the first surface to the second surface), or when the recessed portion is formed in such a manner that the depth thereof is constant, the raw material flows through the space formed between the cap member and the supporting hole more smoothly, and the raw material also flows through the molding hole more smoothly. As a result, an extrusion process can be performed while more precisely reflecting the shape of the molding hole.

In the above extrusion die device, the supporting hole of the die holder may be formed in a forwardly shrinking-shape toward the first surface, and an engagement portion formed in a tapered shape that matches the forwardly shrinking-shape of the supporting hole may be provided on the body of the female die at a position close to the first surface.

According to the above extrusion die device, because the supporting hole of the die holder to which the die assembly is to be attached is formed in a forwardly shrinking-shape toward the first surface, and an engagement portion formed in a tapered shape that matches the forwardly shrinking-shape of the supporting hole is provided at the distal portion of the body of the female die, a positioning process at attaching the die assembly to the supporting hole of the die holder is more reliably performed.

In the above extrusion die device, the die assembly may be accommodated in the supporting hole in such a manner that end portions of the core case of the male die and a peripheral portion of the body of the female die abut against an inner surface of the supporting hole. Moreover, the end portion of the core case may include an inclined surface having a convex-curved shape that matches an inner surface of the supporting hole.

According to the above extrusion die device, because the inclined surfaces provided at both ends of the core case match the inside surface having a forwardly shrinking-shape in the supporting hole, the core case is also positioned while the core case is supported by the inside surface of the supporting hole, and shifting of the core case is also suppressed, and as a result, it is possible to produce extruded products with no fluctuation in thickness.

In the above extrusion die device, the projected portion of the core member may include column portions projecting toward the second surface and being aligned in a row with a constant interval therebetween, neck portions continued to the column portions, and head portions continued to the neck portions and formed in an expanded manner, a space between the column portions, the neck portions, and the head portions and the nesting member may be defined as the molding hole, spaces formed between the column portions and the neck portions adjacent to each other constitute raw material inlet paths having an oval shape in side view, space between the head portions adjacent to each other may constitute raw material paths having a constant width, the raw material inlet paths may be connected to the raw material paths via raw material connection paths, and the head portions defining a portion of the raw material connection paths may be rounded.

According to the above extrusion die device, even when the peripheral surfaces of the projected portion and the molding hole have worn due to repeated extrusion processes, an extrusion process can be resumed by only replacing the core member and the nesting member; therefore, economical advantage can be obtained when compared with an integrated male die and female die.

In the above extrusion die device, a side-view peripheral shape defined by combining a side-view shape of the raw material inlet paths and a side-view shape of the raw material paths may be a gourd shape. Moreover, at least one of the corners of the column portions, the head portions, and the neck portions may be rounded.

According to the above extrusion die device, because the projected portion of the male die includes the column portions, the head portions, and the neck portions arranged separately, the gap between these portions and the molding hole of the female die is used as the molding hole, the raw material inlet paths having an oval shape in side view are constituted by the gaps between the column portions, the raw material paths having a constant width are constituted by the gaps between the head portions, and the rounded raw material connection paths are constituted by the borders between the raw material inlet paths and the raw material paths, the raw material billet flows smoothly when the raw material billet is extruded while passing through the molding hole, and even when a complicated flat multi-hole tube having a plurality of partitioning walls formed therein is produced through an extrusion process, it is possible to produce a flat multi-hole tube having partitioning walls of uniform thickness and high quality. Moreover, because the raw material billet smoothly flows into the molding hole, and friction between the raw material billet and the molding hole is reduced, wear in the vicinity of the column portions and the head portions at the projected portion of the male die is reduced, and thus the life of the die device can be increased.

By employing a gourd shape for the side-view peripheral shape defined by combining the side-view shape of the raw material inlet paths and the side-view shape of the raw material paths, the flow resistance of the raw material billet can be reliably reduced, and the wear of the die device can be reduced.

Moreover, by applying a rounding process to at least one of the corners of the column portions, the head portions, and the neck portions of the projected portion of the male die, the flow resistance of the raw material billet at the corners can be reduced, and the life of the die device can be increased.

Advantageous Effect of the Invention

As explained above, according to the present invention, an extrusion die device is provided which makes it possible to produce flat multi-hole tube tubes having partitioning walls of predetermined thickness by reducing flow resistance of raw material at the flow path located upstream of a molding hole, and thereby improving the flowability of the raw material at the molding hole.

Moreover, an extrusion die device is provided which makes it possible to strongly maintain a supporting state of a die assembly with respect to a die holder, and to produce extruded products with no fluctuation in thickness even when the extruded products are thin products.

Furthermore, an extrusion die device is provided which makes it possible to smoothly introduce raw material into a molding hole formed by a gap between the projected portion of a male die and the hole of a female die, and thereby to produce fair extruded products with few defects even when the extruded products are of complicated shape.

EMBODIMENTS FOR CARRYING OUT THE INVENTION

An embodiment of the extrusion die device according to the present invention will be explained below.

Figure 1:
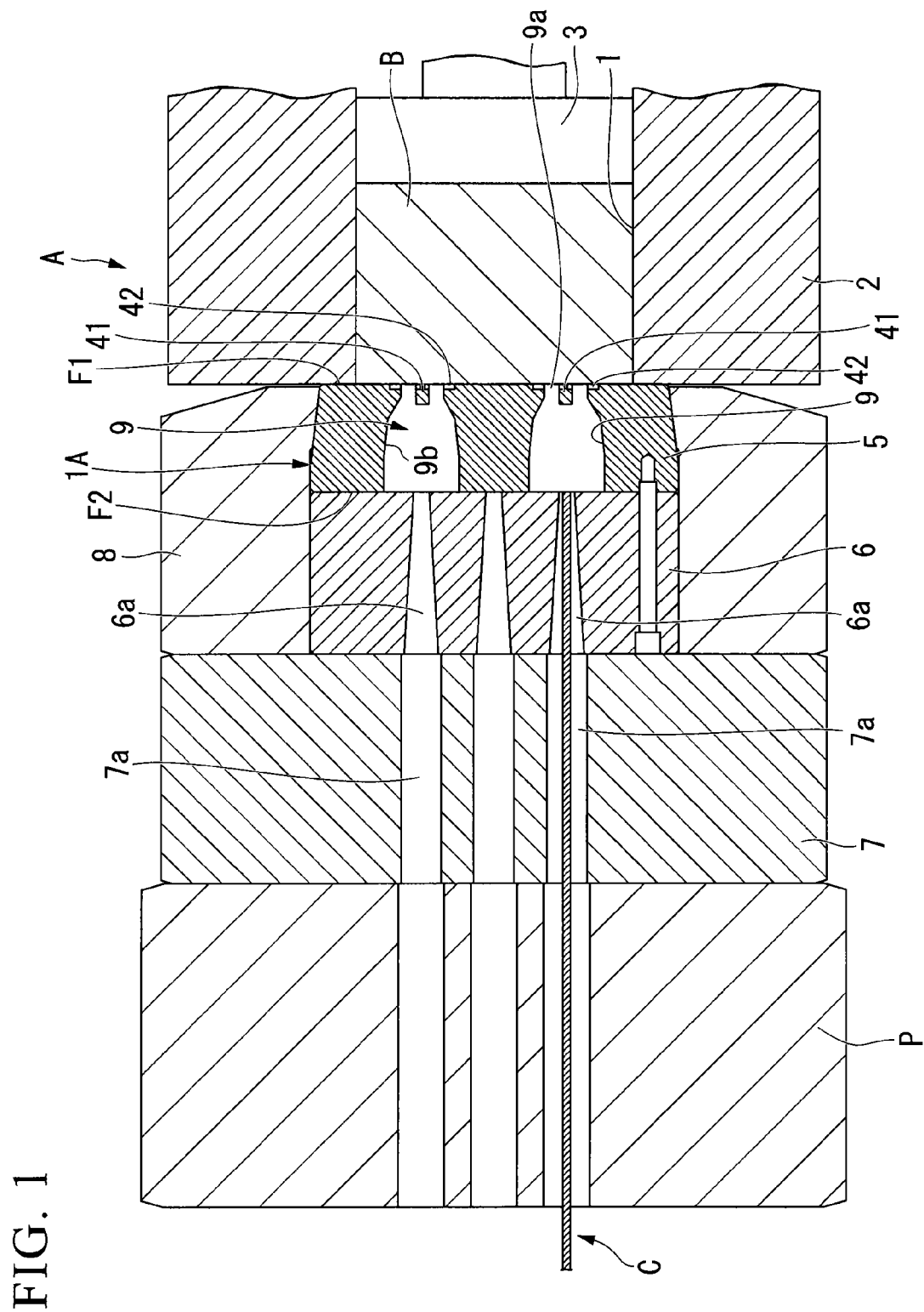
FIG. 1 is a cross-sectional view showing an example of an extrusion device including an extrusion die device according to an embodiment of the present invention.
Figure 2:
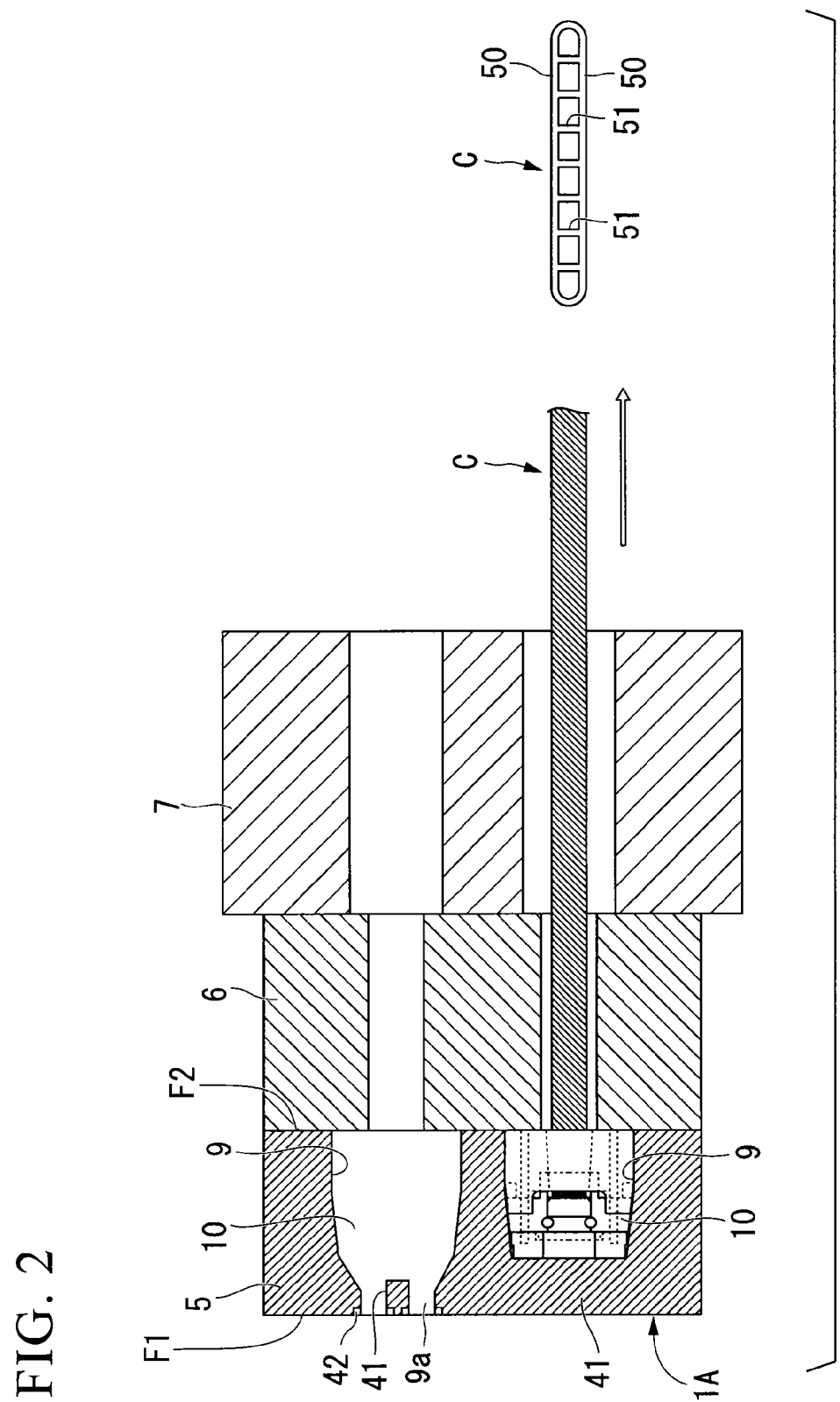
FIG. 2 is a simplified view showing the extrusion device and an extruded product.
Figure 3:
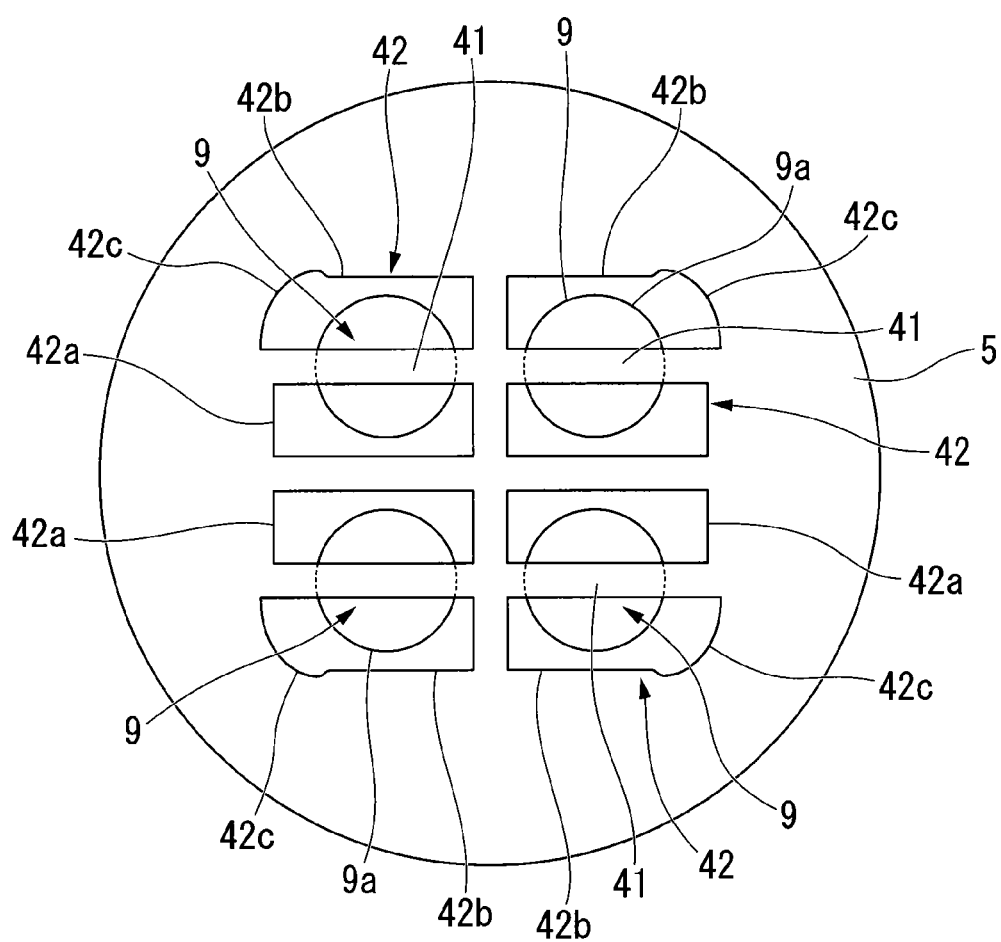
FIG. 3 is a plan view of a die holder included in the extrusion device.
Figure 4:
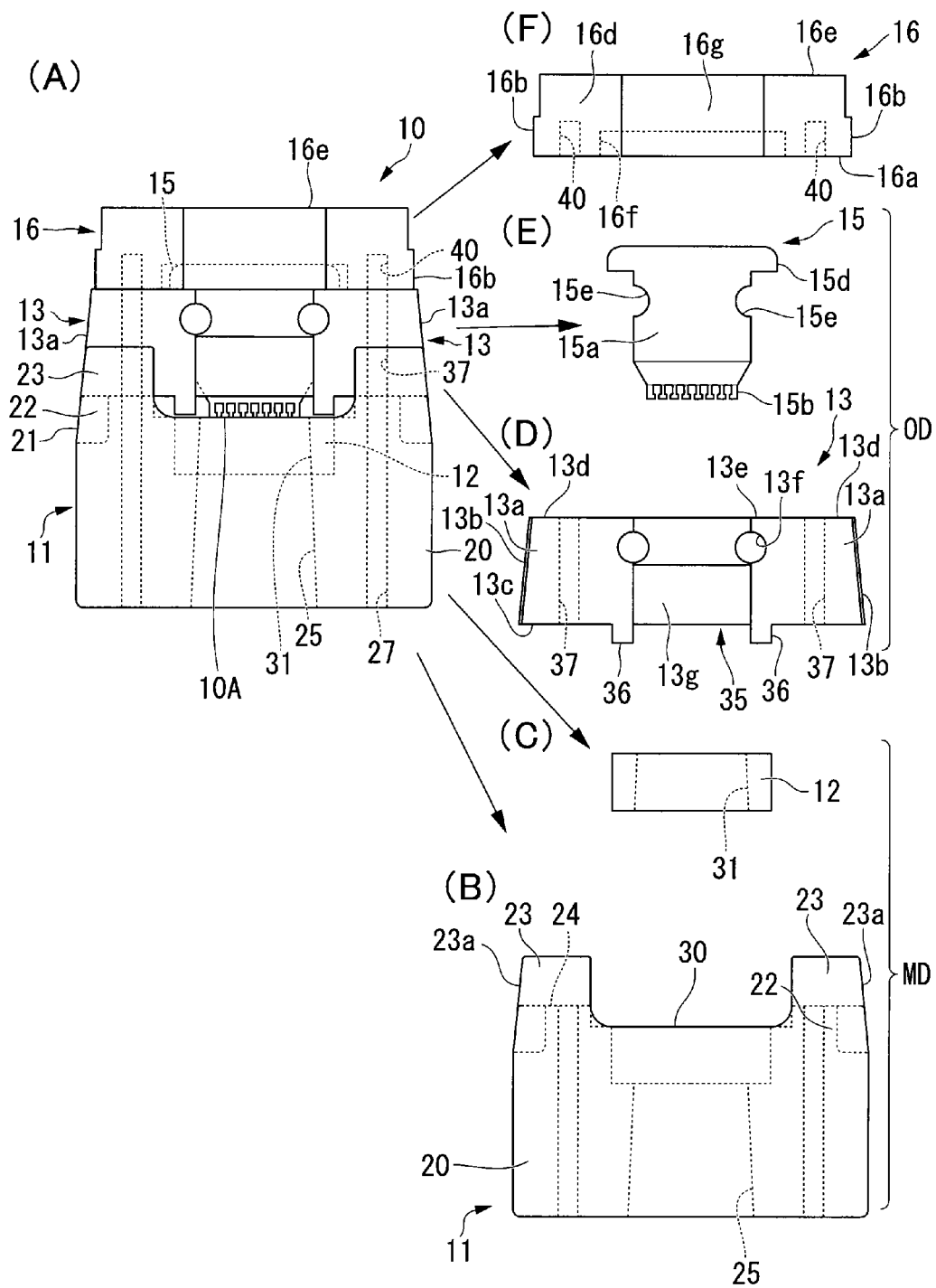
FIG. 4 is a drawing showing an example of a die assembly applied to the present invention. Part (A) of FIG. 4 is an assembly drawing of a body, a nesting member, a core case, a core member, and a cap member, Part (B) of FIG. 4 is a front view of the body, Part (C) of FIG. 4 is a front view of the nesting member, Part (D) of FIG. 4 is a front view of the core case, Part (E) of FIG. 4 is a front view of the core member, and Part (F) of FIG. 4 is a front view of the cap member.
Figure 5:
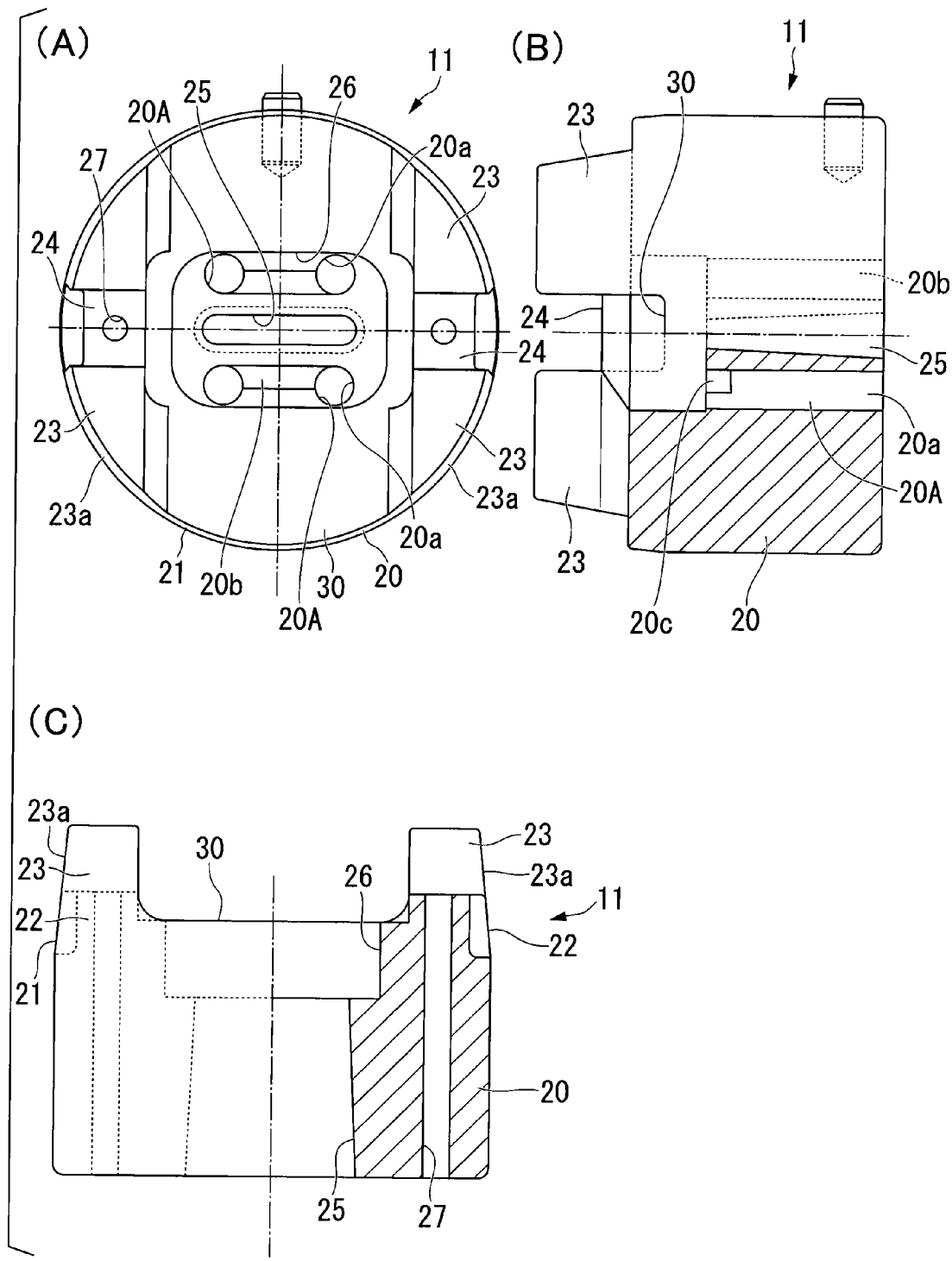
FIG. 5 is a drawing showing an example of a body included in the die assembly applied to the present invention. Part (A) of FIG. 5 is a plan view, Part (B) of FIG. 5 is a right side view, and Part (C) of FIG. 5 is a front view.
Figure 6:
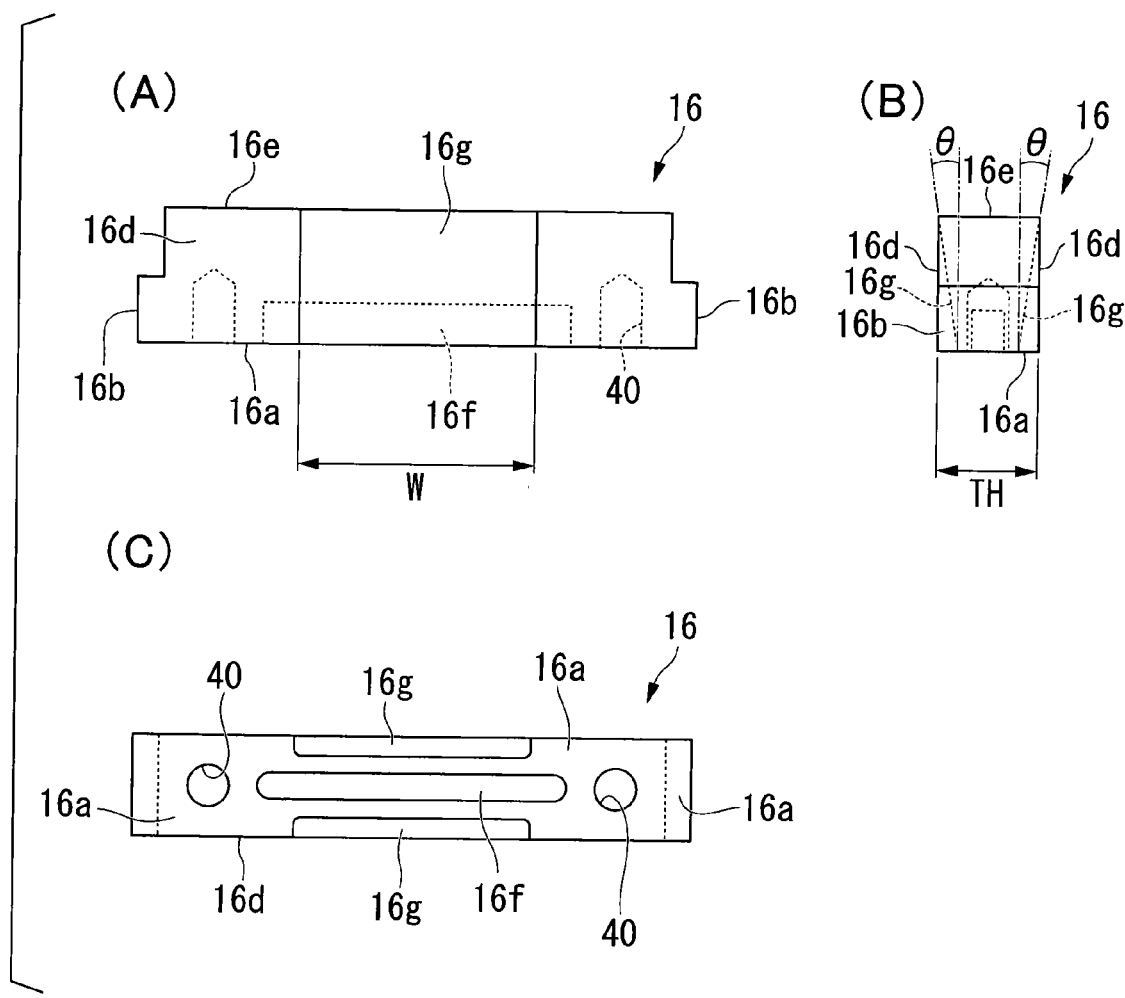
FIG. 6 is a drawing showing an example of a cap member included in the die assembly. Part (A) of FIG. 6 is a front view, Part (B) of FIG. 6 is a right side view, and Part (C) of FIG. 6 is a plan view.
Figure 7:
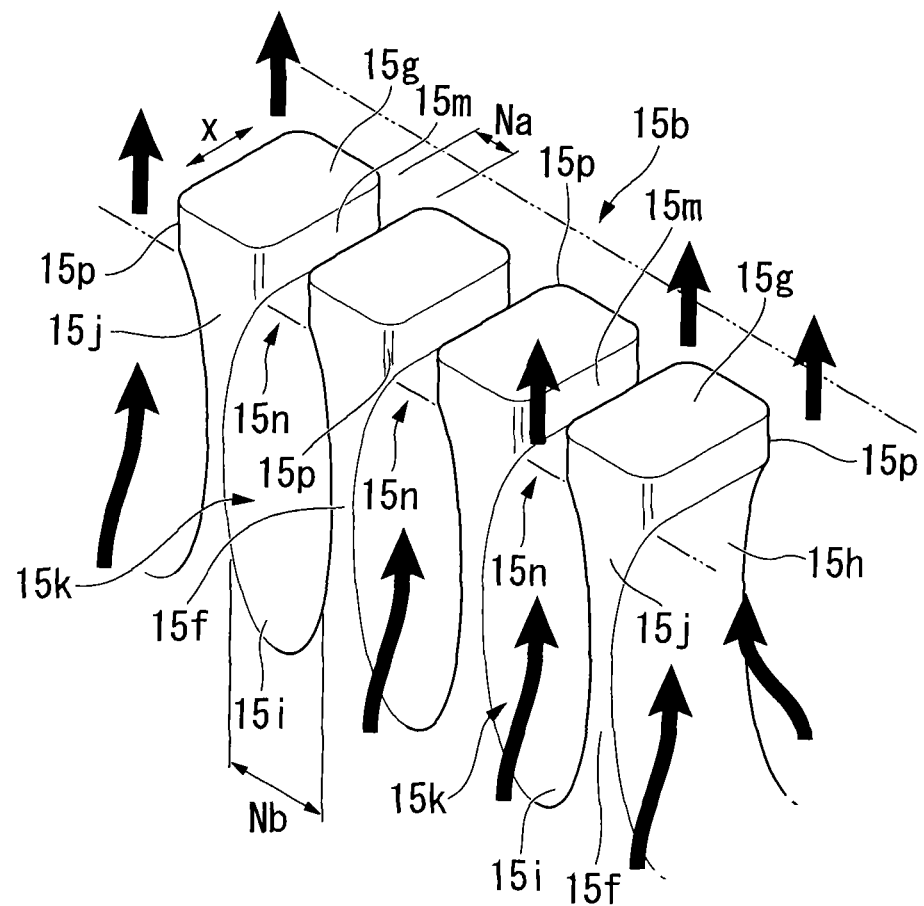
FIG. 7 is an enlarged view of a projected portion of the core member for forming a molding hole provided in the die device.
Figure 8:
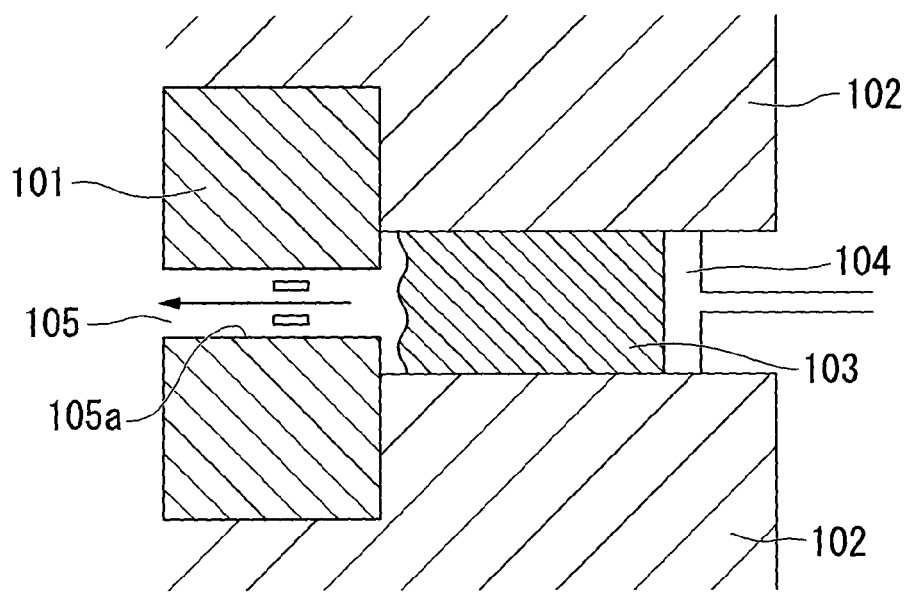
FIG. 8 is a cross-sectional view showing an example of a conventional extrusion device.
Figure 9:
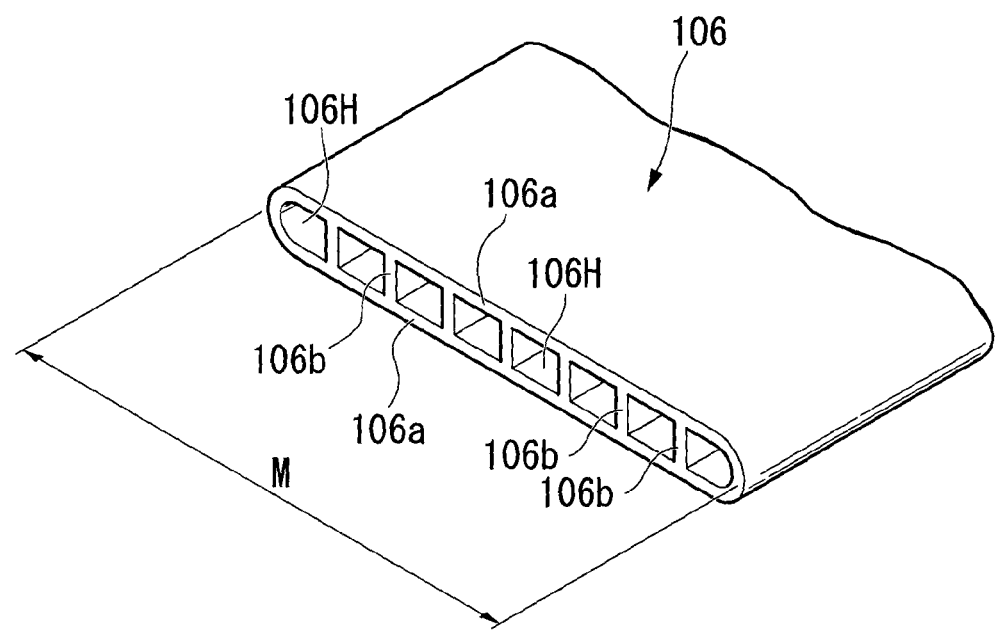
FIG. 9 is a perspective view showing an example of a flat multi-hole tube for a heat exchanger, which is produced by an extrusion device.
Figure 10:
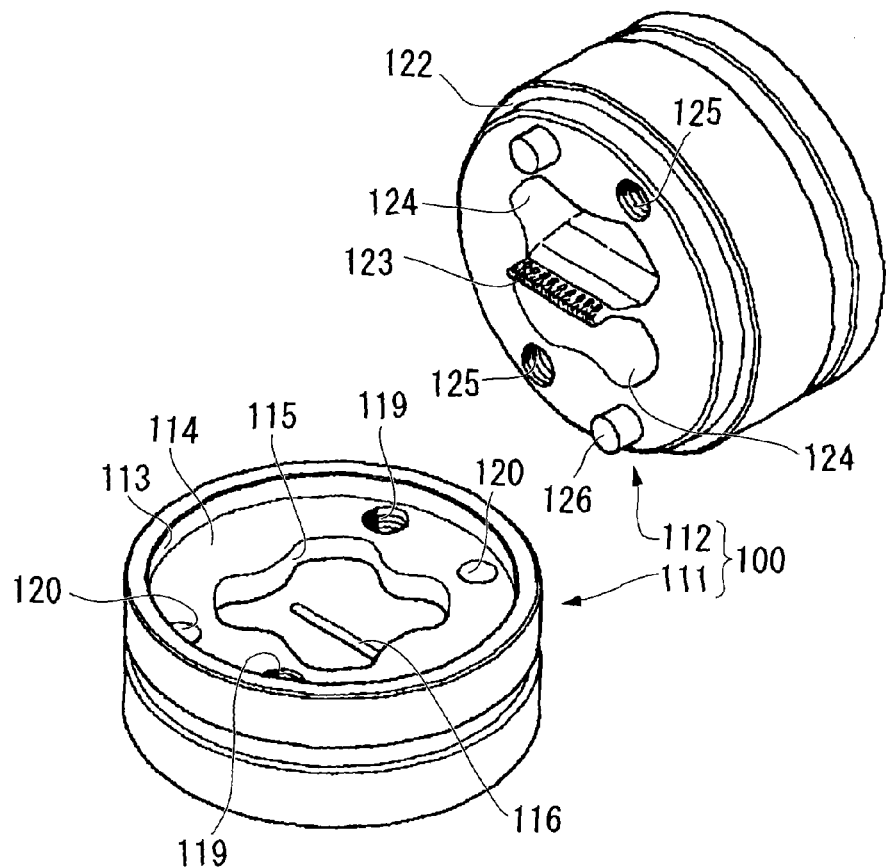
FIG. 10 is an exploded perspective view showing an example of a die assembly applied to the conventional extrusion device.
Figure 11:
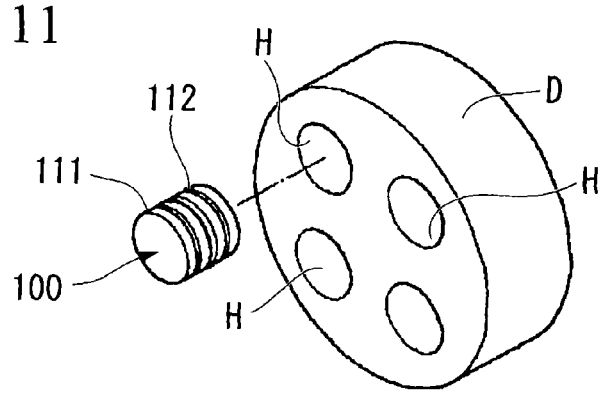
FIG. 11 is a perspective view showing an example of a die holder to which an example of the die assembly is attached.
Figure 12:
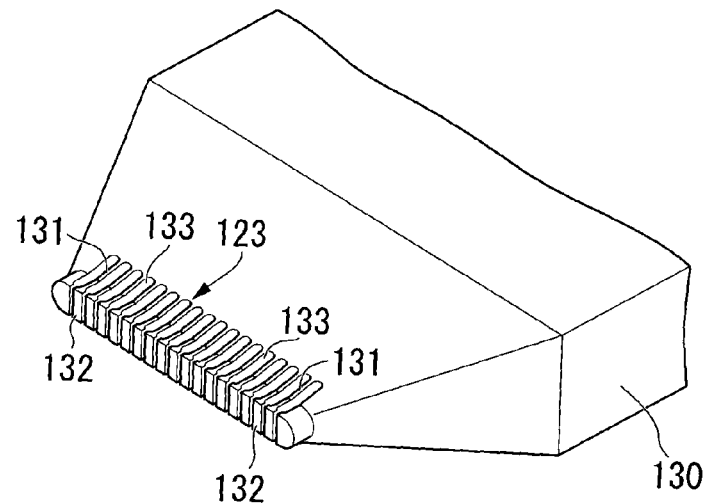
FIG. 12 is an enlarged view of a projected portion of the core member for forming a molding hole provided in the die device.

FIG. 1 is a cross-sectional view showing an extrusion process device A which is an example of a device for extrusion process including a die device for extrusion process 1A according to an embodiment of the present invention, FIG. 2 is a simplified figure of the extrusion process device A, FIG. 3 is a back view of a die holder 5, FIG. 4 is an exploded view showing a die assembly 10 which is an example of die assembly to be attached to the die holder 5, FIG. 5 is a detailed view of a body 11 of the die assembly 10, FIG. 6 is a detailed view of a cap member 16 of the die assembly 10, and FIG. 7 is an enlarged perspective view showing the projected portion of the male die.

The extrusion process device A including the die device for extrusion process 1A of the embodiment shown in FIG. 1 mainly includes a container 2 which is a thick cylindrical container including an accommodating portion 1 for accommodating a raw material billet B made of aluminum, aluminum alloy, or the like, a stem (pressuring means) 3 provided at one side of the container 2 and capable of extruding the raw material billet B in the accommodating portion 1, the die holder 5 provided at the other side of the container 2 with respect to the stem 3, a back plate 6, and a bolster 7.

In the configuration of the embodiment shown in FIG. 1, the die holder 5 having a thick circular-disc shape and the back plate 6 are inserted into inside a die ring 8, and these are integrated.

The die holder 5 includes a first surface F1 located at the inlet side of an extrusion raw material, and a second surface F2 located at the outlet side of a formed material. Inside the die holder 5 and at symmetrical positions around the center axis thereof, there are provided four supporting holes 9 extending from the first surface F1 to the second surface F2, and the die assembly 10 having the configuration shown in FIG. 4 is attached to each of the supporting holes 9.

As shown in FIG. 4, the die assembly 10 of this embodiment mainly includes the body 11 having a cylindrical block shape, a thick plate member (nesting member) 12 having a racing track shape in plan view which is attached to the center of the body 11, a core case 13 which is attached to the body 11 at a position over the plate member 12, a core member 15 which is inserted into the core case 13, a cap member 16 which is attached to the core case 13 and the body 11 while partially covering the core member 15. When the raw material billet B is assumed to be aluminum alloy, it is preferable that these members be made of high speed steel, die steel, or cemented carbide; however, it is particularly preferable that the member having several portions to be contacted by the raw material billet B at high pressure be made of cemented carbide.

In the die assembly 10 in this embodiment, the body 11 and the plate member 12 constitute a female die MD, and the core case 13 and the core member 15 constitute a male die OD.

As shown in FIG. 5 in detail, the body 11 mainly includes a base portion 20 having a cylindrical shape, an engagement portion 22 including an inclined surface 21 at the upper portion thereof so as to be a forwardly and slightly shrinking-shape, and two projected portions 23 which are formed so as to project from two locations of the upper portion of the engagement portion 22 at an interval of 180 degrees. In addition, each of the projected portions 23 is divided into two portions at the center portion thereof by an engagement groove 24, and the outer surface of each of the projected portions 23 is an inclined surface 23a having an upwardly shrinking tapered shape. Furthermore, a concave groove 30, which is wide, extends from an end to the other end of the base portion 20, and is located at position slightly deeper than the engagement groove 24, is provided between the right and left projected portions 23 at the upper side of the base portion 20.

A center hole 25, which has an oval and slit shape and extends through the center portion of the base portion 20, is provided at the center of the base portion 20. An insertion hole 26 for a nesting member, which is connected to the center hole 25 and opens toward the center portion of the concave groove 30, is provided at the center and upper portion of the base portion 20, and the plate member (nesting member) 12 is to be engaged with the insertion hole 26. Moreover, installation holes 27, which extend through the base portion 20 and the engagement portion 22 and open toward the center portion of the engagement groove 24, are provided at two locations of the base portion 20. The installation holes 27 are formed so as to be aligned with holes that are formed at two locations of the core case 13 and the cap member 16 when the core case 13 and the cap member 16, which are described below, are attached to the body 11.

Coolant inlet paths 20a opening toward the bottom surface of the body 11 and the bottom of the insertion hole 26 and coolant outlet paths 20b are provided in the body 11 at positions sandwiching the slit-shaped center hole 25. The adjacent two coolant inlet paths 20a located at one side of the center hole 25 are connected to each other by the concave coolant path 20b formed at the bottom of the insertion hole 26, thereby constitute a coolant path 20A having a U-shape in side view.

A molding hole 31 having an oval and slit shape is provided at the center of the plate member (nesting member) 12. The cross-section of the molding hole portion 31 is almost the same as that of the center hole 25 of the body 11. The size of the plate member 12 is determined so as to engageable with the insertion hole 26 of the body 11. When the plate member 12 is engaged with the insertion hole 26, the molding hole portion 31 of the plate member 12 is located at the center portion of the concave groove 30 of the body 11 so as to be connected to the center hole 25 of the body 11.

The core case 13 shown in FIG. 4 is formed in an elongated plate shape of a size that allows end portions 13a of the core case 13 to be engageable with the engagement groove 24 located between two projected portions 23 of the body 11. The core case 13 includes inclined surfaces 13b having a convex-curved shape and located at the outer surface of the end portions 13a so as to be flushed with the tapered and convex-curved outer surfaces of the projected portions 23 of the body when the end portions 13a of the core case 13 are engaged with the engagement groove 24.

The core case 13 includes a bottom surface 13c facing the bottom of the engagement groove 24, the above-mentioned inclined surfaces 13b located at both sides of the bottom surface 13c, a supporting surface 13d continuously formed with the inclined surfaces 13b and the bottom surface 13c, a supporting surface 13e located opposite to the bottom surface 13c. An engagement hole 35 having a slit shape, with which the core member to be described below is to be engaged, is provided at the center portion of the core case 13 so as to extend through the core case 13 and to open toward the center portions of the bottom surface 13c and the supporting surface 13e. On the bottom surface 13c, there are provided projected portions 36 at two locations near the opening of the engagement hole 35.

Furthermore, in the end portions 13a of the core case 13, there are provided insertion holes 37 each of which penetrates through the end portion 13a, which are to be connected to the installation holes 27 of the body 11 described above when the end portions 13a of the core case 13 are engaged with the engagement groove 24. Moreover, the projected length of the projected portion 36 from the bottom surface 13c is determined so that the tip of the projected portion 36 faces the plate member 12 in the body 11 with a slight gap when the end portions 13a of the core case 13 are engaged with the engagement groove 24 of the body 11 as shown in Part (A) of FIG. 4.

Next, in the core case 13 and at the center portion viewed from the supporting surface 13d, there are provided stepped portions 13g located between the projected portions 36 and extending along the engagement hole 35 from the upper portion to the bottom portion of the supporting surface 13d. The stepped portions 13g allow the raw material billet B to smoothly flow through the core case 13 during an extrusion process.

The core member 15 includes a flat head portion 15a formed in a size allowing insertion into the slit-shaped engagement hole 35 of the core case 13, a comb-shaped portion (projected portion) 15b provided at the distal end of the head portion 15a, a stopper portions 15d provided at rear end of the head portion 15a while projecting right and left, and receiving portions 15e having a semi-circular shape are provided at the right and left portions of the rear portion of the head portion 15a and at the proximal portion of the stopper portions 15d. The core member 15 having the above configuration forms a gap, which is a molding hole 10A for an extrusion process in the die assembly 10, between the opening of the molding hole portion 31 and the tip of the comb-shaped portion 15b when the head portion 15a is inserted into the engagement hole 35 of the core case 13, and, at the same time, the comb-shaped portion 15b of the head portion 15a is partially opposed to the oval-shaped molding hole portion 31 of the plate member 12 while the stopper portions 15d abut against the supporting surface 13e of the core case 13.

The detailed shape of the projected portion 15b is shown in FIG. 7. Column portions 15f are provided in a row with a constant interval therebetween at the distal end of the forwardly shrinking-shaped tip portion of the plate-shaped head portion 15a, and each of the column portions 15f is provided with a head portion 15g at the tip thereof.

The side surfaces, facing each other, of the column portions 15f are formed as curved surface 15h, the bottom portion between the adjacent column portions 15f is formed as a concave-curved surface 15i being continuous to the curved surface 15h, and the peripheral shape of the side surfaces between the adjacent column portions 15f is an oval shape.

The head portion 15g is formed at the upper portion of each of the column portions 15f via a neck portion 15j. The widths the neck portion 15j and the head portion 15g are set to approximately the same as that of the column portion 15f (the width measured along the x direction in FIG. 7), whereas the thickness of the head portion 15g along the thickness direction of the column portion 15f (the thickness measured the direction perpendicular to the x direction in FIG. 7) is greater than that of the column portion 15f. In addition, the gap measured along the thickness direction of the column portion 15f (the thickness measured the direction perpendicular to the x direction in FIG. 7) between the adjacent head portions 15g is constant (width: Na), and an interval Nb between the column portions 15f arranged in a row is also constant.

The column portions 15f, the neck portions 15j, and the head portions 15g having the above configuration constitute raw material inlet paths 15k having an oval shape in side view, raw material paths 15m having a constant width are formed between the adjacent head portions 15g, and the borders between the raw material inlet paths 15k and the raw material paths 15m are defined as raw material connection paths 15n. Accordingly, as shown in FIG. 7, gaps having a gourd shape in side view are formed between the column portions 15f.

Moreover, because the portion from the upper portion of the column portion 15f to the head portion 15g via the neck portion 15j is continuously formed by a smooth curve so as not to have a corner at the connection region, the raw material connection path 15n smoothly connects the raw material inlet path 15k and the raw material path 15m without having a corner. Furthermore, the head portion 15g has substantially a rectangular shape in plan view, and the corners of the rectangular shape are rounded so as to have rounded portions 15p.

The rounding process of the corners of the column portions 15f, the neck portions 15j, and the head portions 15g may be performed using a grinding process, wire-cutting process, or the like so as to obtain a sufficient round size. The round size for these corners is preferably in a range of 0.01 to 0.1 (mm), and when the round size is greater, the cross-section of products may be increased, and the weight thereof may be increased.

The ratio Nb/Na shown in FIG. 7 is preferably in a range of 1.1 to 1.6, and when the ratio is within this range, the outer shape and the column portions 15f are preferably balanced, and an effect of improvement in the flatness of the products is obtained.

As shown in FIGS. 4 and 6, the cap member 16 is a member having a predetermined thickness and a transversely elongated plate shape, which is to be abutted against the supporting surface 13e of the core case 13, and includes a bottom surface 16a to be abutted against the supporting surface 13e of the core case 13, right and left side surfaces 16b connected to the bottom surface 16a, a main surface 16d which is a front surface or a rear surface, and an upper surface 16e located opposite to the bottom surface 16a.

Moreover, at the center of the main surface 16d of the cap member 16, there is provided a stepped portion (recessed portion) 16g which is to be continued to the stepped portion 13g provided in the core case 13 described above when the cap member 16 and the core case 13 are assembled. The stepped portion 16g of the cap member 16, as well as the stepped portion of the core case 13, allows the raw material billet B to smoothly flow during an extrusion process. The stepped portion 16g will be described below in detail.

A recess 16f with which the stopper portion 15d of the core member 15 is to be engaged so as to be covered is provided at the center of the bottom surface 16a. Threaded holes 40, which are connected to the insertion holes 37 of the core case 13 when the cap member 16 is abutted against the supporting surface 13e of the core case 13, are provided at two end portions of the cap member 16.

The threaded holes 40 are formed so as to be connected to the insertion holes 37 of the core case 13 and to the stepped-hole type installation holes 27 of the body 11 when the plate member 12, the core case 13, the core member 15, and the cap member 16 are attached to the body as shown in Part (A) of FIG. 4. By engaging fastening parts such as bolts with the threaded holes 40 while penetrating through these holes, the body 11, the plate member 12, the core case 13, the core member 15, and the cap member 16 can be firmly assembled.

The die assembly 10 is completed by attaching, as shown in Part (A) of FIG. 4, the plate member 12, the core case 13, the core member 15, and the cap member 16 to the body 11 configured as described above, and by engaging bolts with the threaded holes 40 of the cap member 16 through the installation holes 27 of the body 11 and the insertion holes 37 of the core case 13 so as to integrate these members.

The die holder 5 is completed by preparing four die assemblies 10, and by inserting these die assemblies 10 into four supporting holes 9 provided in the die holder 5 shown in FIG. 1, respectively.

The supporting hole 9 of the die holder 5 is formed in a bell shape, i.e., a shape slightly shrinking toward the accommodating portion 1 of the container 2. In the supporting hole 9, a portion close to the accommodating portion 1 is an inlet 9a, and a portion slightly enlarged from the inlet 9a is a holding hole 9b in which the die assembly 10 assembled as shown in Part (A) of FIG. 4 is accommodated and fixed. A bridge portion 41 having a rod-shape is provided at the inlet 9a of the supporting hole 9 so as to pass through the center of the inlet 9a, and the opening of the inlet 9a is expanded by providing stepped portions 42 in the surface of the die holder 5 facing the accommodating portion 1 and at the opening periphery of the inlet 9a. The bridge portion 41 is formed so as to directly receive the pressure from the raw material billet B. By this configuration, it is possible to reduce the pressure applied from the raw material billet B to the die assembly 10 located behind the bridge portion 41, and to prevent or suppress failure or damage of the die assembly 10.

In the present embodiment, as shown in FIG. 3, four supporting holes 9 are provided in the disc-shaped die holder 5 at point symmetry positions around the center thereof at an even interval. The stepped portions 42 are provided around each of the inlets 9a of the die holder 5. An example of the shape of the stepped portions 42 is shown in FIG. 3. In the die holder 5, each of four inlets 9a is divided into two by the bridge portion 41 as viewed from the accommodating portion 1 as shown in FIG. 3, and, in practice, a pair of a first stepped portion 42a and a second stepped portion 42b arranged vertically is provided for each of the inlets 9a. By providing such first stepped portion 42a and second stepped portion 42b, it is possible to reduce flow resistance during supply of the raw material, and to reduce pressing force needed for an extrusion process.

When the die assembly 10 is attached to the die holder 5 by engaging the die assembly 10 with the supporting hole 9, the cap member 16 of the die assemblies 10 is arranged so as to be adjacent to the bridge portion 41 while being aligned in the elongated direction of the bridge portion 41. By using this arrangement, a flow path for the raw material billet B is formed in the supporting hole 9, which extends from the inlets 9a disposed at both lateral sides of the bridge portion 41, to the spaces disposed at both lateral sides of the cap member 16, and to the spaces disposed at both lateral sides of the core case 13. This flow path further extends to the concave groove 30 of the body 11, to the molding hole 10A formed between the core member 15 of the die assembly 10 and the opening of the plate member 12, to the internal space of the plate member 12, and to the center hole 25 of the body 11.

In the arrangement of the stepped portions 42 of the die holder 5 shown in FIG. 3 and in the region where four inlets 9a are arranged, each of four first stepped portions 42a located near the center are formed slightly larger, in both lateral and longitudinal directions, than the semi-circular portion of the opening of the inlet 9a so as to cover the semi-circular portion, and each of four second stepped portions 42b located away from the center in the region where four inlets 9a are arranged has an expanded portion 42c at a position farther from the center of the die holder 5 than the first stepped portion 42a, the second stepped portion 42b being larger than the first stepped portion 42a at the expanded portion 42c and being the same as the first stepped portion 42a at the other portions.

In FIG. 3, the second stepped portions 42b are depicted so as to have a configuration, as an example, in which the expanded portion 42c is provided for each of them so that each second stepped portion 42b is slightly expanded in lateral and vertical directions; however, this expanded shape is merely an example. In the present invention, the configuration is not limited to one shown in FIG. 3, and when four inlets 9a are arranged near the center of the die holder 5 at an interval of 90 degrees, the end portion of each of the second stepped portions 42b located outer region of the region where four inlets 9a occupy may be expanded with only a necessary width in either lateral or vertical direction so as not to have interference with other stepped portions in any directions. By providing the expanded portion 42c by expanding the stepped portion, it is possible to reduce flow resistance during extrusion of the raw material billet B, which will be described below.

Moreover, in the present invention, as shown in FIGS. 4 and 6, the stepped portion 16g is provided at the center of the main surfaces 16d of the cap member 16, and the cross-sectional area of the spaces disposed at both lateral sides of the cap member 16 is expanded when compared with the case in which the stepped portion 16g is not provided.

By this configuration, it is possible to reduce flow resistance during extrusion of the raw material billet B, which will be described below, and to create a smooth flow of the raw material in the spaces and at the molding hole 10A in the supporting hole 9. As a result, an extrusion process can be performed while precisely reflecting the shape of the molding hole 10A, and it is possible to reliably obtain a flat multi-hole tube C including partitioning walls 51 having a predetermined thickness. Moreover, the flow rate of the raw material billet B in the spaces and at the molding hole 10A in the supporting hole 9 can be increased, and it is possible to produce a flat multi-hole tube C at high efficiency.

Here, it is preferable that the stepped portion (recess) 16g be formed by an inclined surface so that the thickness of the cap member 16 gradually reduces toward the core case 13, or be a stepped portion 16g having a constant depth. With this configuration, it is possible to make the raw material flow more smoothly through the spaces disposed at both lateral sides of the cap member 16, and to make the raw material flow more smoothly through the molding hole 10A, as well. As a result, an extrusion process can be performed while more precisely reflecting the shape of the molding hole 10A.

Moreover, when the stepped portion 16g is constituted by an inclined surface, an inclined angle θ where the thickness of the cap member 16 is defined to be D, it is preferable that the stepped portion 16g be a moderately inclined surface so that the thickness of the cap member 16 at a point where the inclined surface reaches the bottom surface 16a of the stepped portion 16g is not too small. When the stepped portion 16g is a stepped portion having a constant depth, not an inclined surface, θ is 0 degree, and it is needless to say that the depth should be determined so that the thickness of the stepped portion 16g is not too thin with respect to the thickness TH of the cap member 16.

Moreover, in view of making the raw material flow through this space more smoothly, it is preferable that the width W of the stepped portion 16g be approximately 1.2 to 2.0 times of the width of the comb-shaped portion 15b of the core member 15. As shown in FIGS. 4 and 6, because the width of the stepped portion 16g is smaller than that of the recess 16f, and a sufficient thickness of the cap member 16 is ensured at both sides of the recess 16f, a robust holding construction can be ensured for the core member when the stopper portion 15d of the core member 15 is engaged with the recess 16f so as to be positioned.

When the stepped portion 16g is formed with a constant depth, it is necessary to determine the thickness of the cap member 16 not too small. When the thickness of the cap member 16 is too small at the stepped portion 16g in the cap member 16, the mechanical strength of the cap member 16 is insufficient, and the cap member 16 may be broken or damaged by the pressure applied thereto during an extrusion process. In addition, when the depth of the stepped portion 16g at this portion is too small, the effect of proving the stepped portion 16g, i.e., an effect of making the raw material billet B flow smoothly, or an effect of making the flow rate be greater, may not be sufficiently obtained. The depth of the stepped portion 16g may be approximately the same as the depth of the stepped portion 13g of the core case 13.

Moreover, passing holes 6a, which are respectively connected to the supporting holes, are provided in the back plate 6 that is provided, as shown in FIG. 1, behind the die holder 5 in which four supporting holes 9 are provided as described above, and furthermore, in the similar manner, passing holes 7a are provided in the bolster 7 provided behind the back plate 6, so that extruded products C produced through an extrusion process using the die assembly 10 can be transferred. In the configuration shown in FIG. 1, a pushing member P is further provided outside the bolster 7; however, this member may be omitted.

When producing extruded products such as flat multi-hole tubes for heat exchangers using the extrusion device configured as described above, the die assembly 10 is installed in the die holder 5, the die holder 5 is set in the extrusion device shown in FIG. 1, the raw material billet B such as made of aluminum or aluminum alloy is accommodated the accommodating portion 1, and pressure is applied to the raw material billet B using the stem 3.

By this operation, the raw material billet B is introduced, from the accommodating portion 1, into the inlet 9a of the die holder 5 through the first stepped portion 42a and the second stepped portion 42b, reaches the concave groove 30 of the body 11 after passing through the spaces in the supporting hole disposed at both lateral sides of the cap member 16 and the spaces in the supporting hole disposed at both lateral sides of the core case 13, passes through the molding hole 10A formed between the core member 15 of the die assembly 10 and the opening of the plate member 12, is formed in a shape of the molding hole 10A, and passes through the passing hole 6a in the back plate 6 and the passing hole 7a in the bolster 7 so as to be obtained as an extruded product C.

In the present embodiment, a flat multi-hole tube (an extruded product) C whose general cross-section is shown in FIG. 2 can be obtained using the molding hole 10A formed by the comb-shaped portion 15b and the plate member 12 including the molding hole 31 having an oval shape, as shown in FIG. 4. The flat multi-hole tube C is formed in a flat cylindrical shape in which the partitioning walls 51 are provided in parallel at a predetermined interval inside a peripheral wall 50 having an oval cross-section.

Here, in the present embodiment, because the stepped portion 16g is provided at the center of the main surfaces 16d of the cap member 16, and the cross-sectional area of the spaces disposed at both lateral sides of the cap member 16 is expanded when compared with the case in which the stepped portion 16g is not provided, it is possible to reduce flow resistance during extrusion of the raw material billet B, and to create a smooth flow of the raw material billet B in the spaces and at the molding hole 10A in the supporting hole 9. Due to this, an extrusion process can be performed while precisely reflecting the shape of the molding hole 10A, and a flat multi-hoe tube C in which the partitioning walls 51 having a predetermined thickness can be reliably obtained. As a result, it is possible to increase yield of the flat multi-hoe tubes. In addition, because the flow rate of the raw material billet B in the spaces and at the molding hole 10A in the supporting hole 9 can be increased, it is possible to produce flat multi-hole tubes precisely at high efficiency.

Figure 13:
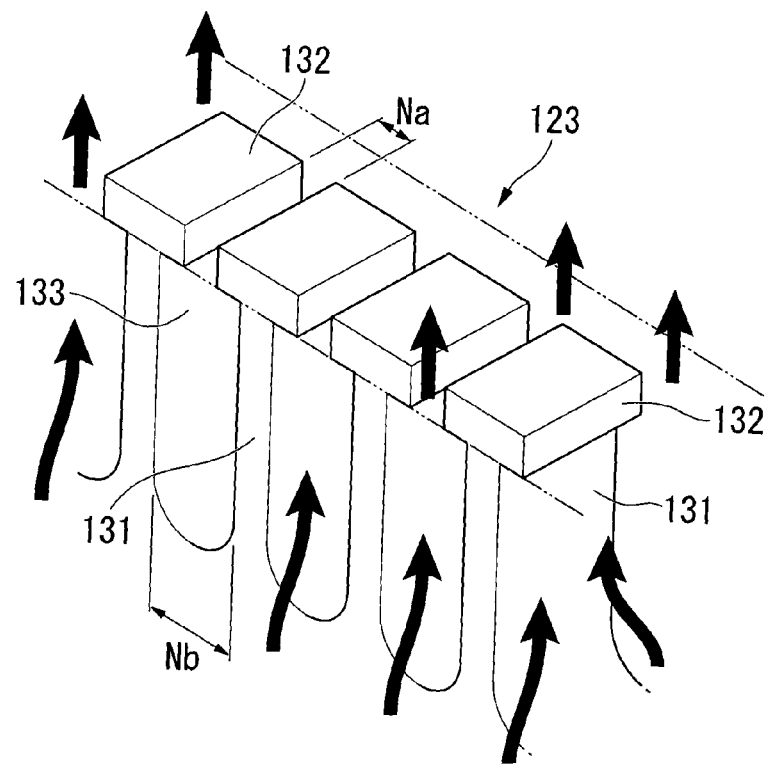
FIG. 13 is a partially enlarged view of the projected portion in the die device shown in FIG. 12.

Furthermore, in the configuration of the present embodiment, the molding hole 10A is formed by the molding hole 31 of the plate member 12 and the comb-shaped projected portion 15b of the core member 15, and because, at the molding hole 10A, the raw material billet B first flows into the raw material inlet paths 15k having an oval shape, then smoothly passes through the raw material path 15m via the raw material connection path 15n, the raw material billet B smoothly flows with resistance less than that in the case of passing around the projected portion 123 having a conventional configuration shown in FIG. 13, and consequently, the extrusion pressure can be reduced, and the wear of the column portions 15f, the neck portions 15j, and the head portions 15g that constitute the projected portion 15b can be suppressed. As a result, the life of the die assembly can be increased.

In the extrusion process described above, even when pressure is applied to the raw material billet B evenly at the surface directing in the extrusion direction so as to extrude the raw material billet B toward the die assembly 10, the raw material billet B is not necessarily flow at the same rate at the all areas of four inlets 9a. More specifically, when viewing four inlets 9a as shown in FIG. 3, comparing the inlets 9a close to the center of the die holder 5 with the inlets 9a away from the center of the die holder 5, the flow rate of the raw material flowing at the inlets 9a close to the center tends to be greater than that of the raw material flowing at the inlets 9a away from the center.

Accordingly, in the present embodiment, because the expanded portion 42c is provided at the outer portion of the stepped portions 42 located in the region where four inlets 9a are disposed so that the area of the stepped portion is increased so as to allow the raw material to easily flow into the inlets 9a, the flowing state of the raw material billet B is made as even as possible over the entire cross-section of four inlets 9a, and as a result, pressure is evenly applied to every portion of the die assembly 10, and desired extrusion pressure can be applied to every portion of the die assembly 10, and consequently, a flat multi-hole tube C having uniform thickness and high quality can be produced without having uneven thickness at the partitioning walls 51.

Moreover, in the die device for extrusion process 1A in the present embodiment, by providing the first stepped portion 42a and the second stepped portion 42b at the opening of the inlet 9a close to the raw material billet B, the area of the introducing point of the raw material billet B with respect to the inlet 9a is increased so that the flow resistance of the raw material at the introducing point is reduced, the raw material is allowed to flow more smoothly than in the case of a conventional die device in which a stepped portion is not provided, and an effect that an extrusion process can be performed with less resistance can be obtained.

Next, in the die device for extrusion process 1A in the present embodiment, because the bridge portion 41 is provided on the cap member 16 of the die assembly 10 at the portion close to the raw material billet B so that the bridge portion 41 directly receives the pressure from the raw material billet B, and the pressure from the raw material billet B applied to the cap member 16 of the die assembly 10 located behind the bridge portion 41 is reduced, it is possible to suppress the pressure directly applied to the die assembly 10, in particular, to the cap member 16, during an extrusion process. Accordingly, the pressure applied to the cap member 16 can be reduced by the bridge portion 41, and consequently, the pressure applied to the other portions of the die assembly 10 can be reduced. As a result, the die assembly 10 can be protected, and breakage or damage of these parts can be prevented or suppressed.

Next, in the die device for extrusion process 1A in the present embodiment, because the stepped portion 16g is provided at the center of the main surfaces 16d of the cap member 16, the flow of the raw material billet B when the raw material billet B flow along the stepped portion 16g is stabilized due to a guiding effect. With this effect, the flowability of the raw material billet B is controlled so that the flow resistance is reduced.

In addition, the flow of the raw material billet B next reaches the stepped portion 13g of the core case 13, and the raw material billet B passes through the molding hole 10A formed between the comb-shaped projected portion 15b and the molding hole 31 of the plate member 12 while the flowability thereof is smoothed also at the stepped portion 13g, and then formed in an objective shape through extrusion. In the die device for extrusion process 1A in the present embodiment, the flow of the raw material billet B can be smoothed both at the cap member 16 and the core case 13, the flow of the raw material billet B up to the molding hole 10A can be smoothed, and an extrusion process can be performed in as smooth a manner as possible.

Moreover, in the present embodiment, when the die assembly 10 is engaged with the supporting hole 9, because the inclined surface 23a of the body 11 of the female die matches the inclined surface 9c having a forwardly shrinking-shape in the supporting hole 9 so that positioning is performed, shifting of the die assembly 10 in a radial direction and an axial direction can be prevented, and as a result, it is possible to produce extruded products with no fluctuation in thickness, and it is possible to produce, for example, a flat multi-hole tube C having uniform thickness and high quality can be produced without having uneven thickness at the partitioning walls 51.

Furthermore, in the present embodiment, when the die assembly 10 is engaged with the supporting hole 9, because the inclined surface 13b provided at both ends of the core case 13 matches the inside surface having a forwardly shrinking-shape in the supporting hole 9, the core case 13 is also positioned while the core case 13 is supported by the inside surface of the supporting hole 9, and shifting of the core case 13 is also suppressed, and as a result, it is possible to produce extruded products with no fluctuation in thickness, and it is possible to produce, for example, a flat multi-hole tube C having uniform thickness and high quality can be produced without having uneven thickness at the partitioning walls 51.

As described above, according to the die device for extrusion process 1A in the present embodiment, because the projected portion 15b includes the column portions 15f, the head portions 15g, and the neck portions 15j arranged separately, the gap between these portions and the molding hole 31 of the female die is used as the molding hole 10A, the raw material inlet paths having an oval shape in side view are constituted by the gaps between the column portions 15f, the raw material paths 15m having a constant width are constituted by the gaps between the head portions, and the rounded raw material connection paths 15n are constituted by the borders between the raw material inlet paths 15k and the raw material paths 15m, the raw material billet B flows smoothly when the raw material billet B is extruded while passing through the molding hole, and even when a complicated flat multi-hole tube having a plurality of partitioning walls 106b formed therein is produced through an extrusion process, it is possible to produce a flat multi-hole tube having partitioning walls of uniform thickness and high quality.

Moreover, because the raw material billet B smoothly flows into the molding hole 10A, and friction between the raw material billet B and the molding hole 10A is reduced, wear in the vicinity of the column portions 15f and the head portions 15g at the projected portion 15b of the male die is reduced, and thus the life of the die device can be increased.

Furthermore, in order to reduce wear during extrusion of the raw material billet B, it is preferable that the side-view peripheral shape defined by combining the side-view shape of the raw material inlet paths 15k and the side-view shape of the raw material paths 15m be a gourd shape. By employing a gourd shape, the flow resistance of the raw material billet B can be reliably reduced.

Moreover, by removing a sharp corner so as to be rounded for at least one of the corners of the column portions 15f, the head portions 15g, and the neck portions 15j of the projected portion 15b of the male die, the flow resistance of the raw material billet B at the corners can be reduced, and the life of the die device can be increased.

INDUSTRIAL APPLICABILITY

According to the present invention, it is possible to provide an extrusion die device which is particularly suitable for extrusion of thin material products such as flat multi-hole tubes.

DESCRIPTION OF REFERENCE SYMBOLS

1A: extrusion die device, A: extrusion device, B: raw material billet, C: flat multi-hole tube (extruded part), OD: male die, MD: female die, F1: first surface, F2: second surface, 1: accommodating portion, 2: container, 3: stem, 5: die holder, 6: back plate, 7: bolster, 8: die ring, 9: supporting hole, 10: die assembly, 11: body, 12: plate member (nesting member), 13: ore case, 13a: end portion, 13b: inclined surface, 15: core member, 15b: projected portion, 15f: column portion, 15g: head portion, 15j: neck portion, 15k: raw material inlet path, 15m: raw material path, 15n: raw material connection path, 15p: rounded portion, 16: cap member, 16d: main surface, 16g: stepped portion (recessed portion), 22: engagement portion, 24: engagement groove, 31: molding hole, 41: bridge portion, 42: stepped portion, 42a: first stepped portion, 42b: second stepped portion

The invention claimed is:

1. An extrusion die device comprising:
   a die holder including a first surface located at an inlet side of an extrusion raw material, a second surface located at an outlet side of a formed material, and a supporting hole penetrating from the first surface to the second surface; and
   a die assembly accommodated in the supporting hole, wherein
   the die assembly comprises:
   a male die including a core member having a projected portion, a core case holding the core member while disposing the projected portion close to the second surface;
   a female die including a body which includes an engagement groove engaging the core case of the male die disposed close to the first surface, and which engages the supporting hole, and a nesting member formed in an annular shape and accommodated in the body at a portion close to the first surface; and
   a cap member formed in a plate shape, disposed at a position closer to the first surface than from the male die, covering a portion of the core member, and connected to the core case,
   a space between the nesting member and the core member is defined as a molding hole allowing the extrusion raw material to pass therethrough, and wherein
   the supporting hole of the die holder is formed in a forwardly shrinking-shape toward the first surface, and an engagement portion formed in a tapered shape that matches the forwardly shrinking-shape of the supporting hole is provided on the body of the female die at a position close to the first surface.

2. The extrusion die device according to claim 1, wherein the cap member comprises:
   two main surfaces; and
   a recessed portion formed at a center of the main surfaces.

3. The extrusion die device according to claim 2, wherein the recessed portion is formed by an inclined surface in such a manner that a thickness of the cap member is gradually reduced from the first surface to the second surface.

4. The extrusion die device according to claim 2, wherein the recessed portion is formed in such a manner that a depth thereof is constant.

5. The extrusion die device according to claim 1, wherein the die assembly is accommodated in the supporting hole in such a manner that end portions of the core case of the male die and a peripheral portion of the body of the female die abut against an inner surface of the supporting hole.

6. The extrusion die device according to claim 5, wherein the end portion of the core case includes an inclined surface having a convex-curved shape that matches an inner surface of the supporting hole.

7. The extrusion die device according to claim 1, wherein the projected portion of the core member includes column portions projecting toward the second surface and being aligned in a row with a constant interval therebetween, neck portions continued to the column portions, and head portions continued to the neck portions and formed in an expanded manner,
   a space between the column portions, the neck portions, and the head portions and the nesting member is defined as the molding hole,
   spaces formed between the column portions and the neck portions adjacent to each other constitute raw material inlet paths having an oval shape in side view, space between the head portions adjacent to each other constitute raw material paths having a constant width, the raw material inlet paths are connected to the raw material paths via raw material connection paths, and the head portions defining a portion of the raw material connection paths are rounded.

8. The extrusion die device according to claim 7, wherein a side-view peripheral shape defined by combining a side-view shape of the raw material inlet paths and a side-view shape of the raw material paths is a gourd shape.

9. The extrusion die device according to claim 7, wherein at least one of the corners of the column portions, the head portions, and the neck portions is rounded.

* * * * *